United States Patent Office 3,040,103
Patented June 19, 1962

3,040,103
PROCESS FOR THE PREPARATION OF ALKYL BORINES
Robert Joly, Montmorency, and Robert Bucourt, Villiers-le-Bel, France, assignors to Roussel-UCLAF Societe Anonyme, Paris, France
No Drawing. Filed Feb. 26, 1960, Ser. No. 11,168
Claims priority, application France July 24, 1959
9 Claims. (Cl. 260—606.5)

The present invention relates to a new process for the preparation of tri-lower-alkyl borines among which certain members, particularly triethyl borine and tri-n-butyl borine, are useful in industry, either for the polymerization of certain monomers or as reducing agents.

The methods of preparation of these alkyl borines heretofore described in the literature are rather laborious and involved either the manipulation of triethylaluminum which is not readily accessible and in which case violent decompositions must be avoided, or the action of alkyllithium upon boron halides, the latter lithium derivatives being very costly.

An object of the present invention is the development of an inexpensive and easy method of producing tri-lower-alkyl borines.

A further object of the present invention is the process of producing tri-lower-alkyl borines by reacting a solution of a lower-alkylzinc halide in a N,N-dialkylamide with a boron trihalide at elevated temperatures.

These and other objects of the invention will become more apparent as the description proceeds.

We have found that solutions of lower-alkylzinc halides dissolved in a N,N-dialkylamide having the formula,

where $R_2$ represents lower alkyl and $R_3$ is a member selected from the group consisting of hydrogen, methyl and ethyl, and particularly in N,N-dialkylformamide, which solutions are readily accessible by the direct reaction of metallic zinc with a lower-alkyl halide in the presence of said N,N-dialkylamide, yield the desired alkyl borines, without any danger, by reaction with halides of boron such as the commercial boron trifluoride or boron trichloride.

The solution of a lower-alkylzinc halide in said N,N-dialkylamide is readily prepared by reacting metallic zinc with a lower-alkyl halide in the presence of a N,N-dialkylamide having the formula,

where $R_2$ and $R_3$ have the meaning given above at temperatures between about 20° and 100° C., preferably in the presence of a small catalytic amount of the iodide of the alkyl in question. The resulting reaction mixture is a stable solution of an alkylzinc halide having the formula, $R_1ZnX$, in an N,N-dialkylamide having the formula,

wherein $R_1$ and $R_2$ represent lower alkyl, $R_3$ is a member selected from the group consisting of hydrogen, methyl and ethyl and X represents a halide. By the above process, it is possible to utilize as starting materials not only alkyl iodides, as it has been practice until now, but also alkyl chlorides and alkyl bromides, which, are substantially less expensive.

In accordance with the process of the invention a boron trihalide is reacted with said solutions of a lower-alkylzinc halide in a N,N-dialkylamide, preferably in the gaseous state and while hot. The reaction proceeds according to the following equation.

$$BX'_3 + 3R_1ZnX \rightarrow B(R_1)_3 + 3XZnX'$$

wherein X and X' represents halogens, either identical or different from each other, and $R_1$ is a lower alkyl radical. The reaction, however, also occurs when a solution of a boron trihalide, such as boron trifluoride or boron trichloride, in a N,N-dialkylamide, or even a complex of the N,N-dialkylamide with boron trifluoride, is introduced into the hot solution of the alkylzinc halide in the N,N-dialkylamide.

When the reaction is complete, the reaction mixture can be heated in order to isolate, by distillation, the alkyl borines having a boiling point less than that of the N,N-dialkylamide used as the solvent, the gaseous trialkyl borine distilling off as fast as it is formed. If the trialkyl borine to be isolated has a boiling point higher than that of the N,N-dialkylamide used as the solvent, either the solvent may be distilled off first, which however causes losses due to entrainment, or the reaction mixture is preferably diluted with water and the high-boiling trialkyl borine is isolated from the aqueous mixture by extracting with an inert organic solvent having a low boiling point, such as ether, isopropyl ether, petroleum ether, benzene, chloroform, etc. After decantation and washing of the organic phase and distilling off the extraction solvent, the desired alkyl borine is obtained.

By either recovery process, the overall yields are good and since the N,N-dialkylamide in which the reaction is effected can be recovered and purified and the zinc halide can be recovered and retransformed by electrolysis into zinc so that it may again be used as the starting material in the preparation of the alkylzinc halide, the process according to the invention essentially consumes only lower alkyl halides and boron trifluoride or boron trichloride, all of which are commercially available products.

Any of the tri-lower-alkyl borines can be produced depending on the choice of the starting lower-alkyl halide. Such compounds as methyl iodide, methyl chloride, methyl bromide, ethyl chloride, ethyl bromide, propyl bromide, isopropyl bromide, n-butyl bromide, isoamyl bromide, etc., may be used to produce the corresponding alkylzinc halide.

The preferred N,N-dialkylamide having the formula

where $R_2$ and $R_3$ have the meanings assigned is N,N-dimethylformamide which is commercially available. Other N,N-dialkylamide solvents such as N,N-dimethylacetamide, N,N-dimethylpropionamide, N,N-diethylformamide, N,N-diethylacetamide, etc., may also be used.

Since the desired alkyl borines readily burst into flame upon contact with air, all the operations are effected in an atmosphere of nitrogen. The optimum reaction temperature is between 50°–160° C. although the reaction occurs at lower temperatures.

The following examples are illustrative of the invention without being construed as limiting in any respect.

EXAMPLE 1

*Preparation of Trimethyl Borine*

A slow stream of methyl bromide is bubbled through a mixture of 200 gm. of metallic zinc, 150 cc. of N,N-dimethylformamide and 5 cc. of methyl iodide (as catalyst) while agitating the mixture. The temperature slowly rises to 100–110° C., and then the reaction mixture is cooled on an ice-water bath to a temperature of 50° C. where it is maintained. The rate of flow of methyl bromide is accelerated and approximately 350 cc. of dimethylformamide are introduced over a period of 30 minutes. Methyl bromide is continued to be bubbled through the mixture at a temperature of 50° C. until the zinc completely disappears, which takes from 2 to 3 hours. The reaction mass contains about 3 gram mols of methylzinc bromide per kilogram.

222 gm. of methylzinc bromide in solution in 235 gm. of N,N-dimethylformamide, obtained above are heated to 92° C. in a stream of nitrogen. While maintaining this solution between 90–100° C. a slow stream of gaseous boron trifluoride is bubbled through the solution for 1½ hours. The trimethyl borine which distills from the reaction medium as fast as it is formed is condensed in a trap which is cooled by a mixture of acetone and Dry Ice to a temperature between −50° and −60° C. Approximately 40 cc. of raw trimethyl borine are obtained. By letting the raw trimethyl borine reheat at room temperature, it is distilled at a temperature of −20° C. into a second trap. 32 cc. of pure trimethyl borine are thus obtained.

EXAMPLE 2

*Preparation of Triethyl Borine*

The procedure described in Example 1 is repeated by passing a stream of boron trifluoride into a solution of 217 gm. of ethylzinc bromide in 225 gm. of dimethylformamide which had previously been heated to 92° C., while cooling slightly so that the temperature does not exceed 100° C. and while maintaining the reaction mixture in an atmosphere of nitrogen. As soon as at least 30 gm. of boron trifluoride have been introduced, which requires 10–15 minutes, the stream of boron trifluoride is stopped and the reaction mixture is heated for one hour at 95–100° C. under reflux condenser. A slight reflux takes place. Thereafter the condenser is removed and is replaced by a distilling column and the triethyl borine is then distilled off by progressively raising the internal temperature. 39.6 gm. of triethyl borine, which is a yield of 97% of a product directly usable in industry, are obtained. By redistilling it a second time, 90% of the product passes over between 94 and 96.5° C.

EXAMPLE 3

*Preparation of Tri-n-Propyl Borine*

The procedure described in the preceding example is repeated, starting with a solution of 225 gm. of propylzinc bromide in 200 gm. of N,N-dimethylformamide, until at least 30 gm. of boron trifluoride have been reacted, and then the reaction mixture is refluxed for 1½ hours by raising the internal temperature to between 150–155° C. The reaction mixture is then cooled to 0° C. and, while continuing to cool so that the temperature does not exceed 15° C. about 300 cc. of water are introduced. The tri-n-propyl borine separates out in the form of a liquid which floats on the surface of the aqueous layer. The mixture is further diluted with water and the tri-n-propyl borine is extracted with benzene. The benzene solution is washed with water, dried over sodium sulfate, filtered and distilled under atmospheric pressure, all of these operations being effected in a stream of nitrogen. After elimination of the benzene and of an intermediate fraction, tri-n-propyl borine distills over at 163–165° C.

EXAMPLE 4

*Preparation of Tri-n-Butyl Borine*

The procedure described in Example 3 is repeated, starting with a solution of 242 gm. of butylzinc bromide in 225 gm. of dimethylformamide. After reaction of at least 30 gm. of boron trifluoride and heating the reaction mixture under reflux for one hour, the temperature of the reaction medium being 155° C., it is cooled to 15–20° C. and approximately 300 cc. of water are added. The tri-n-butyl borine separates out as an oily layer on the surface of the aqueous phase. The mixture is extracted with benzene, the benzene solution is washed with water, dried over sodium sulfate, filtered and distilled at atmospheric pressure all under an atmosphere of nitrogen. After distilling off the benzene and eliminating an intermediate fraction, tri-n-butyl borine is distilled between 205° and 222° C. and collected.

EXAMPLE 5

*Preparation of Triethyl Borine*

47 gm. of boron trichloride in the gaseous state are introduced within one hour into a solution of 210 gm. ethylzinc bromide in 225 gm. of dimethylformamide, which had previously been heated to 33° C. The temperature rises progressively until it reaches 71° C. The reaction mixture is agitated for an additional hour and 15 minutes while letting it cool at room temperature. The tri-ethyl borine is separated from the reaction mixture by distillation with the aid of a distilling column as used in Example 2.

EXAMPLE 6

*Preparation of Tri-n-Butyl Borine*

46 gm. of boron trichloride in the gaseous state are passed within 25 minutes into a solution of 235 gm. of n-butylzinc bromide in 225 gm. of dimethylformamide while agitating and maintaining the solution at 50–55° C. The mixture is then agitated for four hours at 50–55° C. and is cooled to 15–20° C. It is then diluted with 300 cc. of water. The tri-n-butyl borine which separates out on the surface of the aqueous solution is extracted with benzene and separated as described in Example 4.

The preceding examples are illustrative of the invention. It is to be readily understood that alternative procedures, as described and as known to one skilled in the art may be employed without departing from the spirit of the invention or the scope of the appended claims.

We claim:

1. A process for the production of a tri-lower-alkyl borine which comprises the steps of reacting a boron trihalide with a solution of an alkylzinc halide having the formula $R_1ZnX$ in an N,N-dialkylamide having the formula

where $R_1$ and $R_2$ represent lower alkyl, $R_3$ is a member selected from the group consisting of hydrogen, methyl and ethyl, and X represents a halogen, at a temperature between about 50° C. and about 160° C. for a time sufficient to complete the reaction, and recovering said tri-lower-alkyl borine from the reaction mixture.

2. The process of claim 1, wherein said tri-lower-alkyl borine boils at a temperature below the boiling point of said N,N-dialkylamide and is recovered by fractional distillation.

3. The process of claim 2, wherein said tri-lower-alkyl borine is distilled from the reaction mixture as fast as it is formed.

4. The process of claim 1, wherein said tri-lower-alkyl borine is recovered by cooling and diluting the reaction mixture with water, extracting said tri-lower-alkyl borine with a water-immiscible, inert, organic solvent boiling at a temperature below the boiling point of said tri-lower-alkyl borine, distilling off said solvent and recovering said tri-lower-alkyl borine.

5. The process of claim 4, wherein said recovery steps are carried out under an atmosphere of nitrogen.

6. The process of claim 1, wherein said N,N-dialkylamide is N,N-dimethylformamide.

7. A process for the production of trimethyl borine which comprises the steps of reacting boron trifluoride with a solution of methylzinc bromide in N,N-dimethylformamide at a temperature between about 90° and 100° C. under an atmosphere of nitrogen and fractionally distilling and recovering said trimethyl borine as fast as it is formed.

8. A process for the production of triethyl borine which comprises the steps of reacting boron trihalide with a solution of ethylzinc halide in N,N-dimethylformamide at a temperature between about 50° C. and about 100° C. for a time sufficient to complete the reaction in an atmosphere of nitrogen and thereafter fractionally distilling and recovering said triethyl borine.

9. A process for the production of tri-n-butyl borine which comprises the steps of reacting boron trihalide with a solution of n-butylzinc halide in N,N-dimethylformamide at a temperature between about 50° C. and about 100° C. for a time sufficient to complete the reaction in an atmosphere of nitrogen, cooling the reaction mixture, adding water, extracting the aqueous solution with a water-immiscible, inert organic solvent boiling at a temperature below the boiling point of said tri-n-butyl borine, distilling off said solvent and recovering said tri-n-butyl borine by fractional distillation.

References Cited in the file of this patent

Goubeau: F.I.A.T. Reviews of German Science: Inorganic Chemistry, vol. 1, pp. 215–38 (1948).